US012172446B2

(12) United States Patent
Okamoto et al.

(10) Patent No.: US 12,172,446 B2
(45) Date of Patent: Dec. 24, 2024

(54) INKJET RECORDING APPARATUS AND METHOD FOR CLEANING INKJET RECORDING APPARATUS

(71) Applicant: Hitachi Industrial Equipment Systems Co., Ltd., Tokyo (JP)

(72) Inventors: Yusuke Okamoto, Tokyo (JP); Takahiro Arima, Tokyo (JP); Sho Mizoguchi, Tokyo (JP); Akira Miyao, Tokyo (JP); Tatsuo Matsumoto, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 101 days.

(21) Appl. No.: 17/911,340

(22) PCT Filed: Dec. 9, 2020

(86) PCT No.: PCT/JP2020/045911

§ 371 (c)(1),
(2) Date: Sep. 13, 2022

(87) PCT Pub. No.: WO2021/199506

PCT Pub. Date: Oct. 7, 2021

(65) Prior Publication Data

US 2023/0127348 A1 Apr. 27, 2023

(30) Foreign Application Priority Data

Mar. 30, 2020 (JP) ................................ 2020-060234

(51) Int. Cl.
*B41J 2/165* (2006.01)
*B05B 15/555* (2018.01)

(52) U.S. Cl.
CPC ......... *B41J 2/16552* (2013.01); *B05B 15/555* (2018.02)

(58) Field of Classification Search
CPC .... B41J 2/16552; B41J 2/1721; B05B 15/555
See application file for complete search history.

(56) References Cited

U.S. PATENT DOCUMENTS

| | | | |
|---|---|---|---|
| 2012/0299993 A1 | 11/2012 | Steuer et al. | |
| 2021/0229446 A1 | 7/2021 | Yamaguchi et al. | |

FOREIGN PATENT DOCUMENTS

| | | | |
|---|---|---|---|
| EP | 2862718 A1 * | 4/2015 | ............. B41F 17/28 |
| JP | 61-193857 A | 8/1986 | |

(Continued)

OTHER PUBLICATIONS

Japanese-language Office Action issued in Japanese Application No. 2023-113679 dated Jan. 23, 2024 with English translation (5 pages).

(Continued)

*Primary Examiner* — Julian D Huffman

(74) *Attorney, Agent, or Firm* — Crowell & Moring LLP

(57) ABSTRACT

The present invention provides an inkjet recording device capable of automatically cleaning the head tip and a cleaning method for inkjet recording apparatus.

An inkjet recording apparatus has a printhead that receives a supply of ink and prints, a main unit that supplies said ink to said printhead, and a cleaning unit that has a cleaning tank into which said entire printhead is inserted and injects a cleaning solution from a cleaning nozzle to said printhead for cleaning. The cleaning unit has a cleaning nozzle that sprays cleaning liquid into the cleaning tank and a cleaning base section that has a housing section that accommodates the tip of the printhead and allows said cleaning liquid to flow into the housing section. The cleaning liquid is allowed to flow into the housing section to clean the tip of the printhead.

10 Claims, 10 Drawing Sheets

(56) References Cited

FOREIGN PATENT DOCUMENTS

| | | | |
|---|---|---|---|
| JP | 7-80385 | A | 3/1995 |
| JP | 2008-201021 | A | 9/2008 |
| JP | 2019-171651 | A | 10/2019 |
| WO | WO 2019/234965 | A1 | 12/2019 |

OTHER PUBLICATIONS

International Search Report (PCT/ISA/210) issued in PCT Application No. PCT/JP2020/045911 dated Mar. 9, 2021 with English translation (four (4) pages).
Japanese-language Written Opinion (PCT/ISA/237) issued in PCT Application No. PCT/JP2020/045911 dated Mar. 9, 2021 (four (4) pages).

* cited by examiner

INKJET RECORDING APPARATUS AND METHOD FOR CLEANING INKJET RECORDING APPARATUS

TECHNICAL FIELD

The present invention relates to an inkjet recording apparatus and a method of cleaning an inkjet recording apparatus.

BACKGROUND ART

An inkjet recording apparatus is widely used for industrial use, such as for printing on products in a production line of a product production line. The print head of the inkjet recording apparatus may contaminate the inside of the head and the head tip surface by bouncing ink particles ejected from the nozzle or the like when printing. If printing is continued in this state, there is a possibility that print quality will be degraded. Further, when the time for stopping the printing operation becomes long, a problem such as a nozzle of a printhead and a contamination near an opening at the tip of a printhead is fixed, and the like, and a normal ink droplet ejection cannot be performed, and thus, a print quality deteriorates. Therefore, it is necessary to appropriately clean the print head. However, it is not only troublesome to perform the cleaning of the printing head manually, but also there has been a problem that the working time required for the cleaning operation and the amount of the solvent used and the degree of the ink stain removal change depending on the degree of skill of the worker. To solve such a problem, a technique of WO2019/234965A1 (Patent Document 1) is known.

Patent Document 1 discloses an inkjet recording apparatus including a cleaning unit for automatically cleaning an entire printhead. The cleaning unit includes a cleaning tank containing a printhead, a cleaning nozzle that ejects a cleaning liquid to a printhead inserted (accommodated) in the cleaning tank, an air nozzle for drying, and a recovery container that collects the cleaning liquid after cleaning.

CITATION LIST

Patent Document

Patent Document 1: WO2019/234965A1

SUMMARY OF THE INVENTION

Problems to be Solved by the Invention

In the technology of the patent document 1, the entire printhead is inserted inside the cleaning unit, and high pressure cleaning solution is sprayed from the cleaning nozzles toward the printhead. Therefore, the components inside the printhead (nozzles, charging electrodes, deflecting electrodes, gutters, etc.) can be automatically cleaned.

However, while the technology of this document is mainly suitable for automatic cleaning of the internal components of the printhead, it is not sufficient for cleaning the opening at the tip of the printhead coverwhere ink particles are ejected against the printed object. Therefore, the tip of the head must be cleaned manually by the operator, and this remains a challenge in terms of complete cleaning automation.

Therefore, the purpose of the present invention is to provide an inkjet recording apparatus and a cleaning method for inkjet recording apparatus that can also automatically clean the tip of the printhead.

Solutions to Problems

In order to achieve the aforementioned purposes, the present invention, in one example, is an inkjet recording apparatus having a printhead that receives ink supply and performs printing, a main unit that supplies said ink to said printhead, and a cleaning unit that has a cleaning tank into which said printhead is inserted and injects a cleaning solution from a cleaning nozzle to said printhead for cleaning. The inkjet recording apparatus is an inkjet recording apparatus having a cleaning unit, which has a cleaning tank and a cleaning base part that accommodates the tip of the printhead and allows the cleaning liquid to flow into the cleaning tank.

Another example of the present invention is a method of cleaning an inkjet recording apparatus having a printhead that receives a supply of ink and performs printing, a main unit that supplies said ink to said printhead, and a cleaning unit that has a cleaning tank that houses said printhead and injects a cleaning solution from a cleaning nozzle to said printhead for cleaning. The method of cleaning an inkjet recording apparatus, wherein a cleaning base portion is provided that accommodates the tip of the printhead and has a housing portion into which the cleaning solution can flow, and wherein the tip of the printhead is accommodated in the housing portion and the tip of the printhead is cleaned by the cleaning solution.

Effects of the Invention

According to the present invention, an inkjet recording apparatus and a cleaning method for inkjet recording apparatus can be provided that can perform automatic cleaning of the head tip.

MODE FOR CARRYING OUT THE INVENTION

Specific examples of the invention are described below using FIG. 1 through 10. The invention is not limited to the examples described below. In each of the following figures, identical devices are given the same number (code), and, in principle, explanations of devices already described are omitted.

(The State of Use of the Inkjet Recording Apparatus in the Example)

Figure 1:
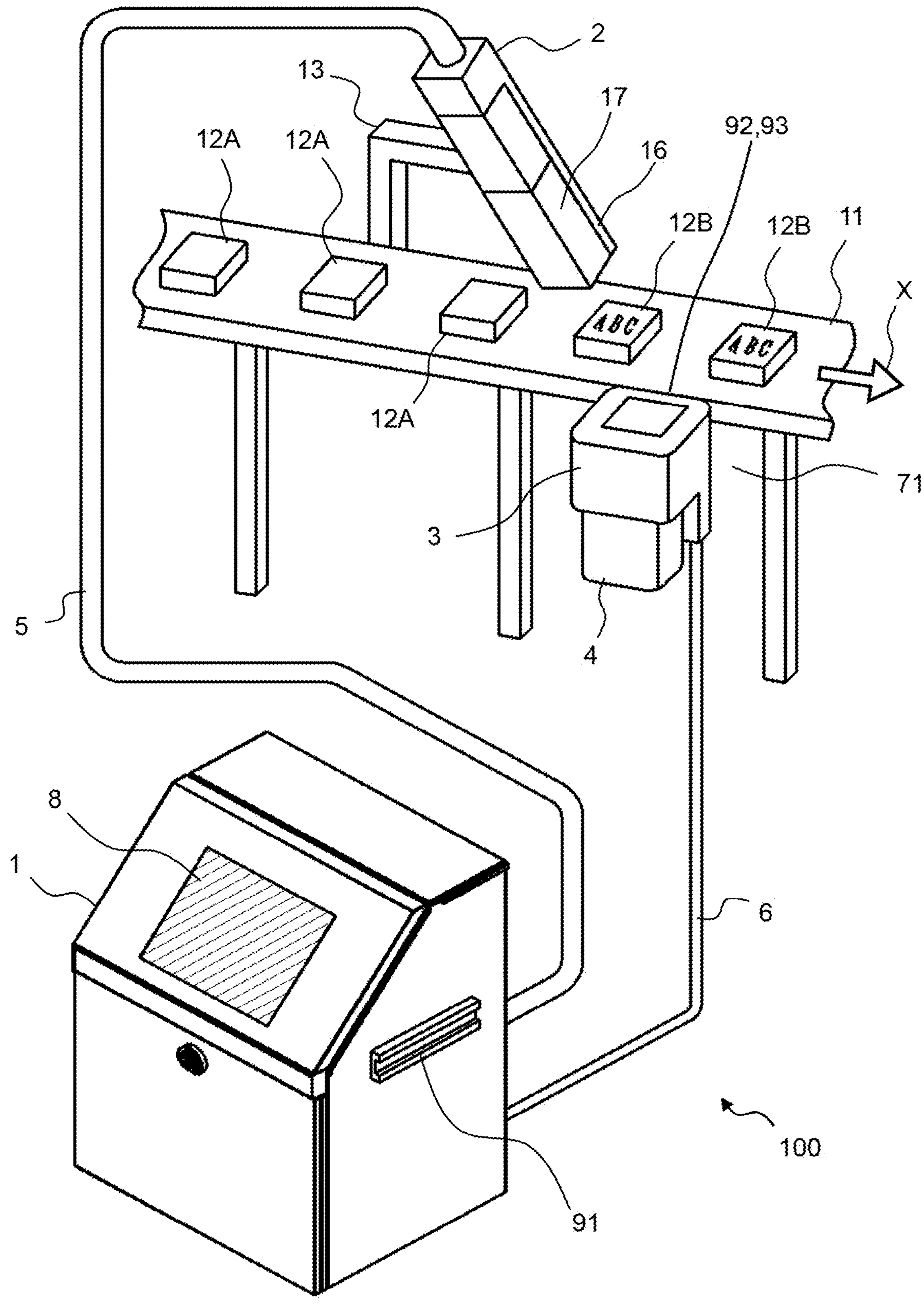
FIG. 1 shows use of the inkjet recording apparatus in the example of the present invention.

First, the basic configuration and state of use of the inkjet recording apparatus 100 in this example will be described. FIG. 1 shows the inkjet recording apparatus 100 in use in this example.

First, as shown in FIG. 1, the inkjet recording apparatus 100 for this example has a main unit 1, a printhead 2 connected to the main unit 1 via a conduit 5 for the printhead, and a cleaning unit 3 connected to the main unit 1 by conduit 6 for the cleaning unit.

The inkjet recording apparatus 100 is installed in a production line in a factory where, for example, food or beverages are produced. The main unit 1 has the function of supplying ink for printing to the printhead 2 and collecting ink that has not been used by the printhead 2. The main unit 1 is also equipped with an ink container for storing ink, an auxiliary ink container for replenishing ink in the ink container when the ink in the ink container has been used for printing and is low, and a route for supplying and collecting ink and solvent, and a group of open/close valves (solenoid valve group) and a group of pumps installed along the route. Furthermore, the main unit 1 is equipped with a control unit (not shown in the figure) for controlling printing by the printhead and controlling the supply and collection of ink and solvent, etc., and an operation display unit for indicating control commands to the control unit and for displaying various conditions of the inkjet recording apparatus. 8. The control section can be specifically realized by a well-known general computer. That is, the control section (computer) consists of an MPU (micro-processing unit) that executes control operations by means of a program, a ROM (read-only memory) that stores the program to operate the MPU, and RAM (random access memory) that stores the data, etc. necessary for control execution. Since the computer configuration is well known, further description of the control unit is omitted here. The main unit 1 is installed in a location where space is available for periodic maintenance work.

The printhead 2 is fixed to the printhead fixing bracket 13 installed near the belt conveyor 11, and is used to print on the objects 12A and 12B fed in the direction of arrow X on the conveyor belt 1. The print object 12A indicates the print object before printing, and the print object 12B indicates the print object after printing. The printhead 2 is equipped with nozzles, charging electrodes, deflecting electrodes, and other components (not shown in FIG. 1) on the head base 16. The printhead 2 is also equipped with a head cover 17 for the purpose of protecting these components.

The cleaning unit 3, which is provided for cleaning the printhead 2, is mounted near the conveyor belt 11 by means of a fixing jig 92 and a fixture for fitting the fixing jig 92 into the 93 to fit the fixing jig 92 and the jig 93 to fit the fixing jig 92. The cleaning unit 3 includes a cleaning tank 71, cleaning nozzles (not shown in FIG. 1) for cleaning the printhead 2 set in the cleaning tank, a recovery container 4, and the like. Conduit 6 is a conduit for supplying cleaning liquid from the main unit 1 to the cleaning unit 3.

(Overall Route Configuration)

Figure 2:
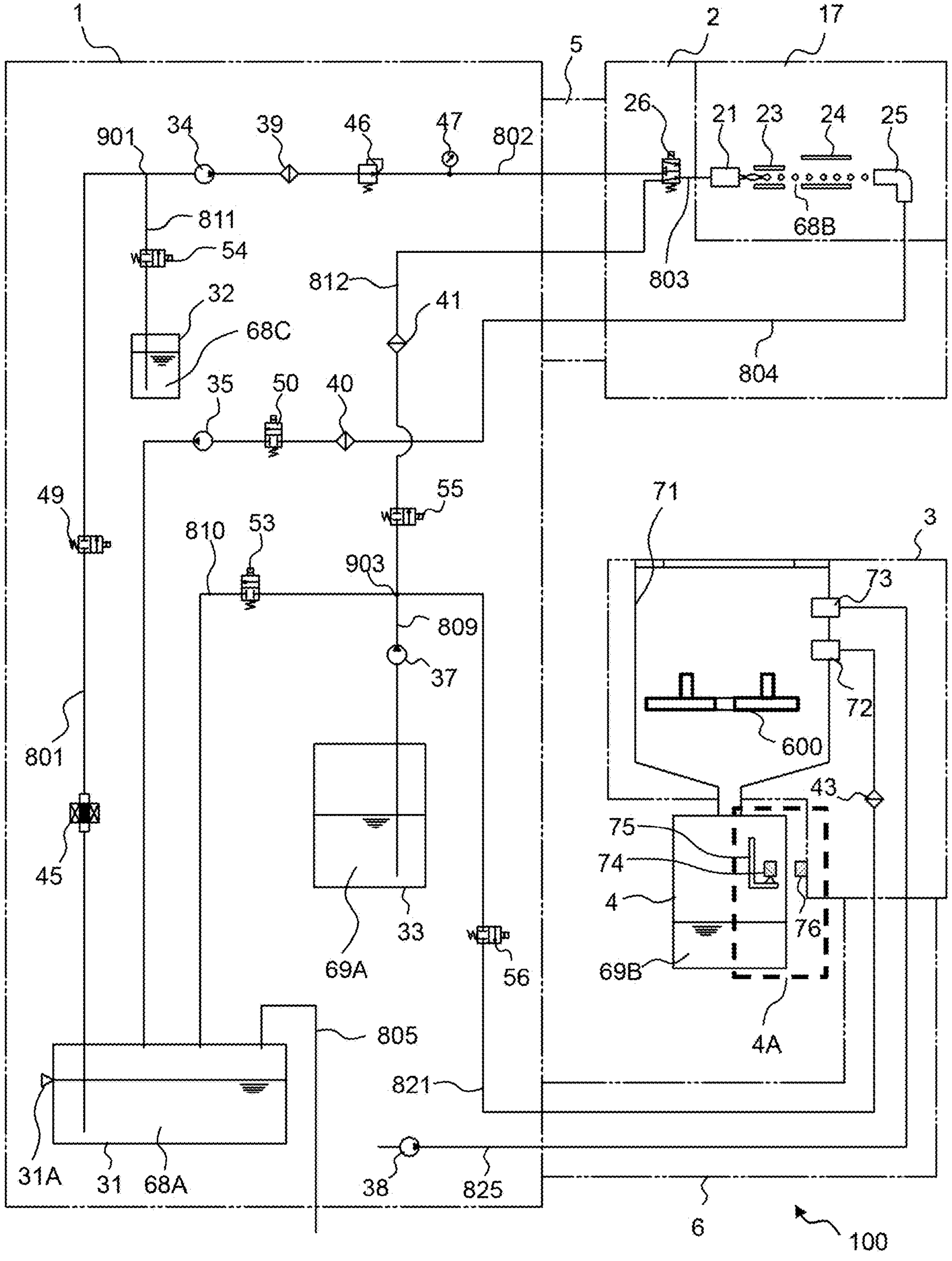
FIG. 2 shows the overall path configuration of the inkjet recording apparatus in the example.

Next, the route configuration of the inkjet recording apparatus 100 in this example will be described. FIG. 2 shows the overall path configuration of the inkjet recording device in this example.

In FIG. 2, the inkjet recording apparatus 100 is equipped with a main unit 1, a printhead 2, a cleaning unit 3, and conduits 5 and 6 connecting them. and conduits 5 and 6 connecting them. The main unit 1 and printhead 2 are connected by conduit 5. The main unit 1 is connected to the cleaning unit 3 by conduit 6.

First, the path for ink supply from the main unit 1 to the printhead 2 (paths 801-803) that supply ink from the main unit 1 to the printhead 2 are explained. In FIG. 2, the main unit 1 is equipped with an ink container 3 for containing (storing) circulating ink 68A 1 is provided.

Ink container 31 is connected to path 801 at the portion immersed in ink 68A. The ink container 31 is connected to path 801 at the part immersed in ink 68A. In the middle of the path 801, a viscosity measuring device 45 (Viscosmeter) and a solenoid valve 49, which opens and closes the path for ink supply, are installed. The viscometer 45 is connected to path 801 at the part immersed in ink A. The viscometer 45 is provided to measure the viscosity of the ink.

Further, path 801 is connected via a junction path 901 to a pump 34 located in path 802. The pump 34 sucks and feeds the ink 68A. Then, at an output side of the pump 34, a filter 39 (ink supply) for removing foreign matters mixed in the ink 68A is connected.

The filter 39 is connected to pressure regulator valve 46. Pressure regulator valve 46 is adjusts the ink 68A pumped from pump 34 to the correct pressure for printing. The regulating valve 46 is connected to a pressure sensor 47 that measures the pressure of ink 68A supplied to nozzle 21. The path 802 in which the pressure sensor 47 is located passes through the conduit 5 and is connected to the printhead 2. Specifically, it is connected to a switching valve 26 for controlling whether ink 68A is supplied to nozzles 21.

The switching valve 26 is connected via a path 803 to a nozzle 21 having a discharge port for discharging ink 68A. Note that the switching valve 26 is a three-way solenoid valve. The switching valve 26 is connected to the ink supply path 802 and the nozzle cleaning path 812, and can switch the supply of the ink 69A and the solvent 68A to the nozzle 21. In the straightforward direction of the discharge port of the nozzle 21, a charged electrode 23 for adding a predetermined charge amount to the ink particles 68B previewed by the nozzle 21 (applying a charge amount corresponding to the printing contents) is provided. Further, on the output side of the charged electrode 23, a deflecting electrode 24 for deflecting the ink particles 68B used for printing corresponding to the amount of charge is provided. Then, on the output side of the deflection electrode 24, a gutter 25 for capturing ink particles 68B that fly straight forward without being charged or deflected because it is not used for printing is disposed. Printing is performed by landing the ink particles 68B deflected by the deflecting electrode 24 on the printed object.

Next, the ink recovery path (path 804) of the inkjet recording system 100 in the present embodiment will be described. In FIG. 2, gutter 25 is connected to path 804. The path 804 passes through the conduit 5 and is connected to a filter 40 (for ink recovery), and filter 40 is connected to solenoid valve 5, which opens and closes path 804 0 (for ink recovery). Further, the solenoid valve 50 is connected to a pump 35 (for ink recovery) that sucks the ink particles 68B captured by the gutter 25. The pump 35 is connected to the ink container 31. In such a configuration, the ink particles 68B captured by the gutter 25 are recovered in the ink container 31 via the solenoid valve 50 and the pump 35. The ink container 31 is connected to the path 805 in the upper space that does not come into contact with the ink 68A, and the path 805 has a configuration that communicates with the outside of the main unit 1. Through the path 805, the gas in the ink container 31 can be released to the outside.

Next, a solvent supply path (path 809~810) of the inkjet recording device 100 will be described. In FIG. 2, the main body 1 is provided with a solvent container 33. The solvent in the solvent container 33 is used for solvent supply, nozzle cleaning, and head cleaning to the ink container 31.

The solvent container 33 is connected to the path 809 at a portion immersed in the solvent 69A. The path 809 also includes a pump 37 used for sucking and pumping the solvent. The pump 37 is connected to the branch path 903 to change the supply destination of the solvent 69A according to the purpose. The branch path 903 is connected to a solenoid valve 53 for opening and closing the flow path disposed in the path 810 in the solvent supply path, and the solenoid valve 53 is connected to the ink container 31 and the path 809.

In such a configuration, in order to supply the solvent 69A to the ink container 31, the solenoid valve 53 may be opened and the pump 37 may be driven. The supply (replenishment) of solvent to the ink container 31 is performed to return the ink viscosity to a viscosity within the predetermined value range when the ink viscosity detected by the viscosity meter 45 becomes higher than the predetermined value.

Next, the ink refill route of the inkjet recording apparatus 100 in this example will be described. In FIG. 2, the main unit 1 is provided with an auxiliary ink container 32 that holds ink 68C for replenishment. The auxiliary ink container 32 is connected to the path 811 for ink supplementation at the portion immersed in ink 68C. The path 811 is connected to a solenoid valve 54 that opens and closes the path. The solenoid valve 54 is connected via the confluence path 901 to a pump 34 installed in the path 802 and used for sucking and pumping the ink 68C. Then, the ink 68C in the auxiliary ink container 32 is sent to the print head 2, passes through an ink recovery path consisting of a path 804, a solenoid valve 50, and a pump 35 via the nozzle 21 and the gutter 25, and flows into the ink container 31. In this way, the refill ink 68C can be replenished in the ink container 31.

The timing of replenishing the ink in the auxiliary ink container 32 to the ink container 31 is performed using the liquid level detection value of the liquid level detection device 31A that detects the liquid level of the ink in the ink container 31. That is, the ink container 31 is provided with a liquid level detection device 31A that detects whether or not the ink in the ink container 31 has reached a reference liquid level that is an appropriate amount. The detection signal of the liquid level detection device 31A is sent to the control unit (not shown). The control unit executes ink replenishment control at the timing when this detection signal is detected.

Next, the nozzle cleaning paths (path 809 and path 812) are described. In FIG. 2, pump 37 located in path 809 is connected to branch path 903 and is connected to route 812 via route 812. Path 812 is connected to a solenoid valve 55 (for nozzle cleaning) for opening and closing the flow path. The solenoid valve 55 is connected to a filter 41 (for nozzle cleaning) for removing foreign matter in the solvent 69A. The Filter 41 is provided in the middle of the path 812 through the conduit 5. The filter 41 has a configuration connected to a changeover valve 26 for controlling whether or not the solvent 69A for cleaning is sent to the nozzle 21. In this configuration, by opening solenoid valve 55 and driving pump 37, the solvent in solvent container 33 is supplied to the nozzles to 21 to be cleaned.

Next, the basic configuration of the cleaning unit 3 of the inkjet recording apparatus 100 in this example is described.

In FIG. 2, the cleaning unit 3 for cleaning the printhead 2 consists of a cleaning tank 71, a cleaning nozzle 72 that sprays cleaning liquid to clean the printhead 2 set in the cleaning tank 71, and a drying nozzle 72 that sprays drying air to dry the printhead 2 after cleaning. The cleaning unit 3 includes a cleaning base portion 600 having an inflow of the cleaning liquid ejected from the cleaning nozzle 72 and a storage portion at the end of the print head, and a recovery container 4 that recovers the cleaning liquid 69B installed at the bottom of the cleaning tank 71 and flowing out of the opening at the low portion of the cleaning tank.

The cleaning solution used in the cleaning unit 3 is the solvent 69A held in the solvent container 33 in this example. Therefore, the solvent 69A of the solvent container 33 is connected to the path 809 at the portion being immersed, and the pump 37 provided in the middle of the path 809 is connected to the path 821 via the branch path 903. The path 821 is connected to the cleaning nozzle 72 of the cleaning unit 3. In the middle of the path 821, a solenoid valve 56 for opening and closing the flow path is disposed. With this configuration, by opening the solenoid valve 56 and performing control for driving the pump 37, the solvent 69A in the solvent container 33 can be supplied to the cleaning nozzle 72 in the cleaning unit 3 as a "cleaning solution".

The cleaning solution may be supplied from a cleaning solution supply device provided separately from the solvent in the solvent container of the main body 1.

After cleaning the printhead, air is blown out from air nozzle 73 to dry the printhead 2. The air nozzle 73 is connected to the path 825. Air can be injected from the air nozzle 73 into the cleaning tank 71 by driving the pump 38 installed in the middle of the path 825. The main unit 1 and the cleaning unit 3 are connected by conduit 6. The recovery container 4 is provided to contain the cleaning solution 69B after cleaning.

When the cleaning solution 69B in the container reaches a liquid level above a certain level, the recovery container 4 is removed and the cleaning solution 69B is discharged. The recovery container 4, which has been emptied by draining the cleaning solution 69B, is reattached to the bottom of the cleaning tank 71 to contain the cleaning solution 69B. Cleaning of the printhead 2 is performed by the operator operating the operation display 8 (see FIG. 1) after the printing operation is completed and instructing the control unit (not shown) to perform the cleaning sequence. The cleaning of the printhead 2 may be executed automatically by the control unit after the printing operation is completed. The sequence control of a series of cleaning operations is described below.

A liquid level detector 4A is provided in the recovery container 4 of the cleaning unit 3. The liquid level detector 4A has a float 74 that can move up and down according to the liquid level in the recovery container 4, and a float 7 4 is equipped with a holder 75 that holds it. A sensor 76 is installed outside the recovery container 4 that outputs a liquid level detection signal when the float 74 comes close to it due to vertical movement. The detection signal of sensor 76 is transmitted to the control unit (not shown). Here, since the sensor 76 is installed outside the recovery container 4, it does not interfere with removal or installation of the recovery container 4. When the cleaning solution 69B in the recovery container 4 accumulates to the amount to be discharged, it is input to the liquid level detection signal HA control unit of the sensor 76. The control unit displays a warning on the operation display unit 8 (shown in FIG. 1). Thereby, the operator can recognize the timing of performing the waste liquid of the recovery container 4 by this warning display. A check valve or the like may be provided in the lower part of the recovery container 4 so that the cleaning solution can be discharged without being removed from the cleaning tank 71.

(Configuration of Printhead)

Figure 3A:
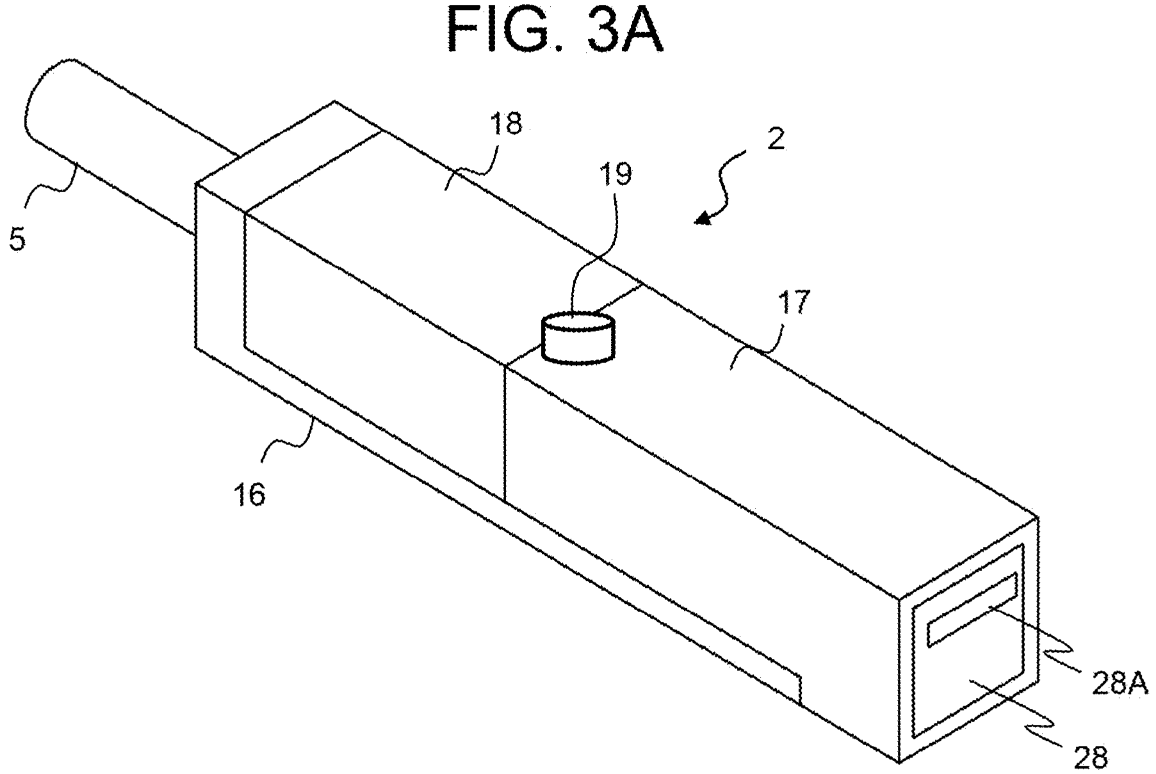
FIGS. 3A and 3B are Configuration diagrams of the printhead in the example.
Figure 3B:
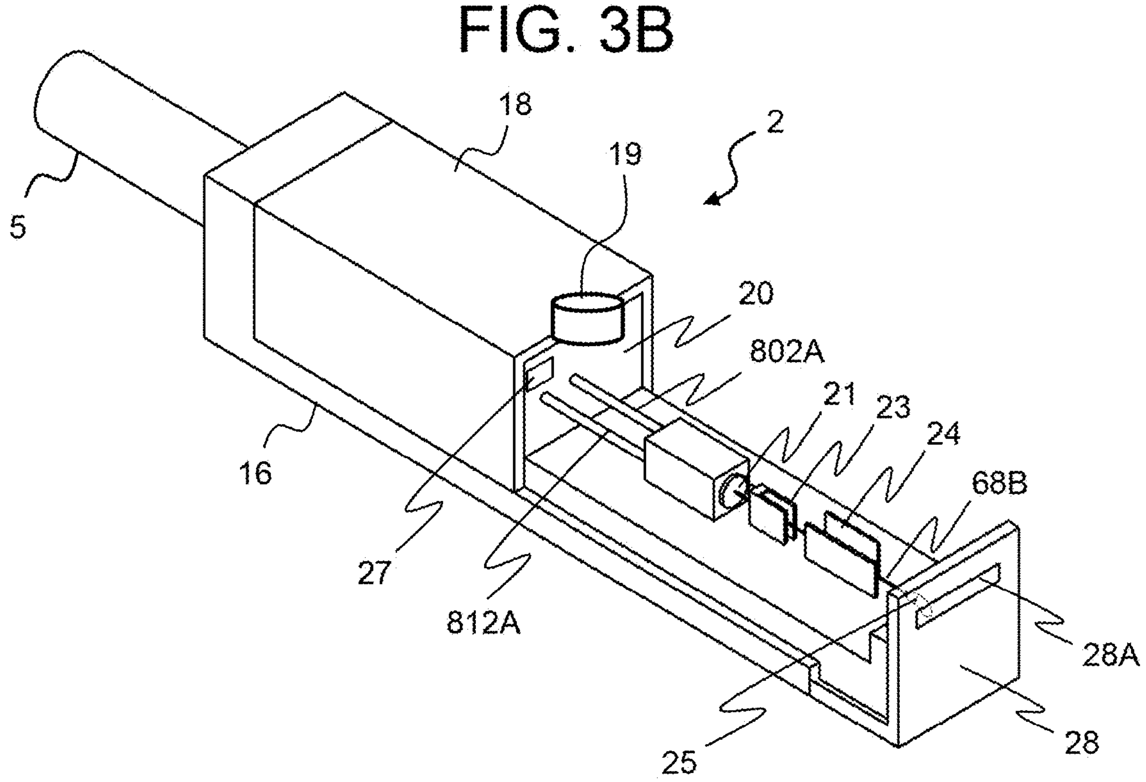

Next, the configuration of the printhead 2 of the inkjet recording apparatus 100 in this example is explained using FIG. 3. FIG. 3 shows an external view of the printhead in this example. In FIG. 3, (A) shows an external perspective view of the print head 2 with the head cover 17 attached, and (B) is a perspective view of the print head 2 with the head cover 17 removed.

As shown in FIG. 3, the print head 2 includes a head base 16, a protective cover 18, a head cover 17 attached to the protective cover 18 by a fixing knob 19, and a printing opening 28A for the ink particles used for printing It includes a head tip 28 formed for passing. When such a head cover 17 is attached, the space surrounded by the head base 16, the head cover 17, and the head tip portion 28 is protected from an impact during maintenance or the like. The parts enclosed by the head cover 17 are maintained by workers who perform daily work. In addition, the internal area surrounded by the head base 16 and the protective cover 18 is maintained by a so-called service worker.

Next, using (B) in FIG. 3, the print head 2 in which the head cover 17 shown is removed will be described. The head base 16 is provided with a nozzle 21, a charged electrode 23, a deflecting electrode 24, a gutter 25, and a head tip portion 28. Further, a tube (for supply) 802A formed of a solvent-resistant material and a tube (for cleaning) 812A are connected to the nozzle 21.

In addition, the printhead 2 has a partition member 20 assembled between the protective covers 18 of the head base so that the inside of the protective cover 18 is not exposed even when the head cover 17 is removed. A partition member 20 is assembled between the head base and the protective cover 18 so that the inside of the protective cover 18 is not exposed even when the head cover 17 is removed. The partition member 20 also has a sensor 27 that can detect whether the head cover 17 is attached and whether the printhead 2 is attached to the cleaning unit 3.

The head tip 28 may be removable to improve maintenance workability of the nozzle 21.

(Specific Configuration of the Cleaning Unit)

Figure 4:
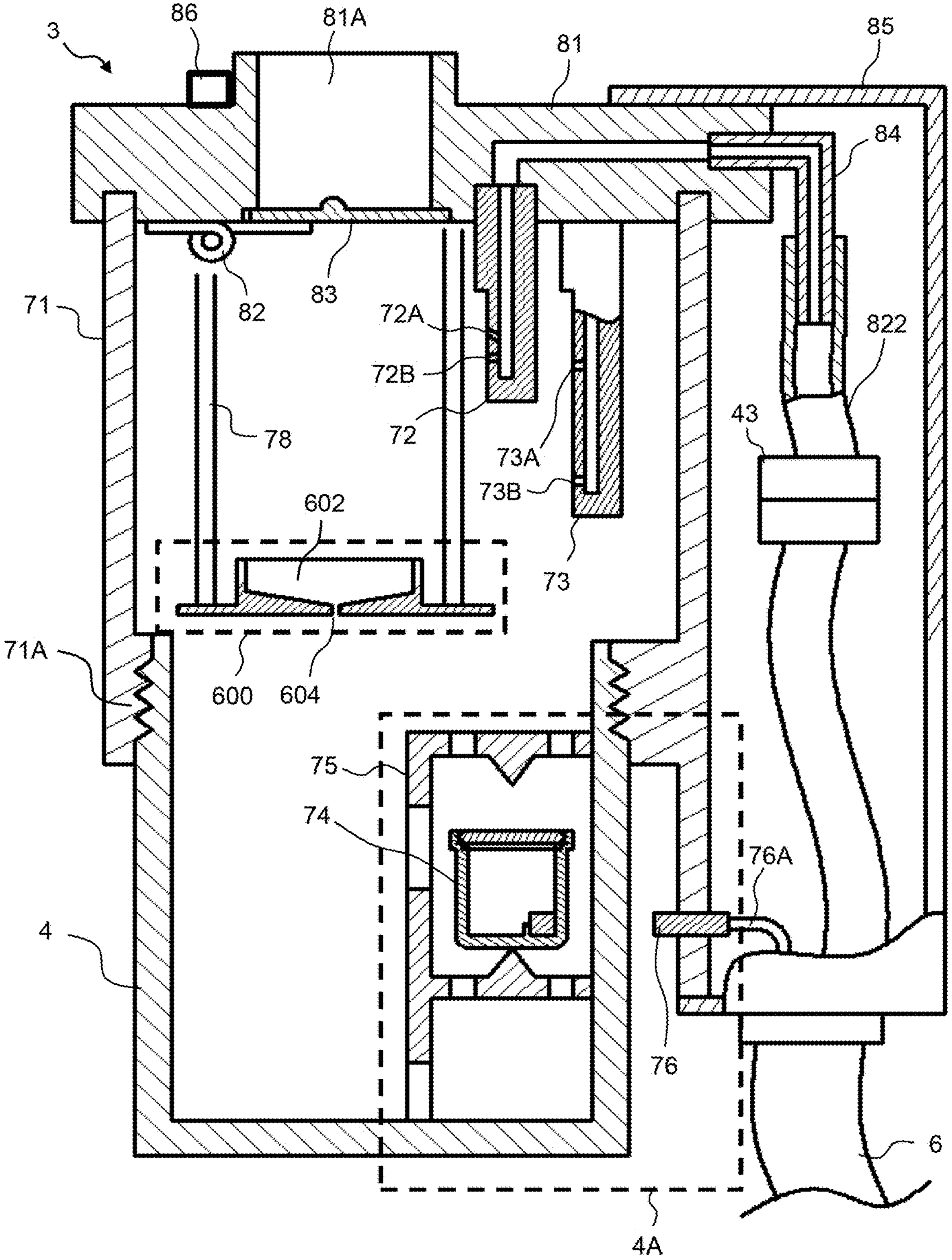
FIG. 4 is a diagram of the cleaning unit in the example.

Next, the specific configuration of the cleaning unit 3 is explained using FIG. 4.

In FIG. 4, a lid block 81 is installed on top of the cleaning tank 71. The lid block 81 has a printhead insertion portion 81A, and this insertion portion 81A allows the printhead 2 to be inserted into the cleaning tank 71. On the underside of the insertion portion 81A, a lid member 83 is provided, which is held in place by the spring force of the lid hinge 82. It is normally closed. This structure is to prevent dust, etc. from entering the cleaning tank 71. 85 is a cover to protect the piping portion.

When cleaning the print head 2, an operator inserts the print head 2 into the cleaning tank 71 from the insertion portion 81A. At this time, the lid member 83 closed by the spring force of the lid hinge 82 rotates, and the print head 2 is set in the cleaning tank 71. At this time, it is detected whether or not the print head 2 has been inserted into the cleaning unit 3 by the proximity sensor 86 disposed near the insertion portion 81A. This detection signal is transmitted to the control unit (not shown). The control unit confirms this detection signal and starts cleaning. The cleaning liquid sent to the cleaning unit 3 by path 822 flows into the cleaning nozzle 72 and flows into the nozzle. Filter 43 is provided in the middle of path 822 to remove debris in the cleaning solution. The cleaning nozzle 72 sprays a cleaning solution against the cleaning site of the print head 2 inserted (accommodated) for cleaning. The cleaning nozzle 72 in this embodiment has two discharge holes 72A and 72B. The air nozzle 73 provided to dry the printhead 2 after cleaning. The recovery container 4 is attached to a lower portion of the cleaning tank 71 by a threaded mounting portion 71A, and is configured to be attachable and detachable. A liquid level detector 4A is provided in the recovery container 4 to detect the liquid level. The liquid level detector 4A includes a float 74 disposed in the holder 75, a magnet installed in the float 74, and a sensor 76 that detects the position of the float 74 by detecting the magnetism of the magnet of the float 74. The sensor 76 is attached to the outside of the container, and the position detection signal detected by the sensor 76 is transmitted to the control unit by the electric wire 76A.

In FIG. 4, reference numeral 600 denotes a cleaning base portion. The cleaning base portion 600 is located in the cleaning tank 71. This cleaning base portion 600 is used to clean the tip of the printhead 2. In this example, the cleaning base portion 600 is suspended by the support rod 78, which is a support member. Any support structure can be used as long as the cleaning base 600 can be deployed in the cleaning tank 71. The cleaning base portion 600 has a housing section 602 that accommodates the tip of the printhead 2 and allows the inflow of the cleaning solution. Further, a sloped surface is formed at the bottom of the housing section 602, and a liquid drain hole 604 is formed at the bottom of the bottom surface. The cleaning liquid ejected from the cleaning nozzle 72 falls (flows down) after cleaning the internal components (internal parts) of the print head 2. Due to the fall of this cleaning solution, the cleaning liquid flows into the housing section 602 and is stored. The tip of the printhead 2 is cleaned by the cleaning solution that flows into the housing 602. The cleaning liquid collected in the housing section 602 then flows out downward from the liquid drain hole 604. The details of the specific configuration of this cleaning base portion 600 will be explained later by FIG. 7.

(Cleaning Operation in a Cleaning Unit)

Figure 5:
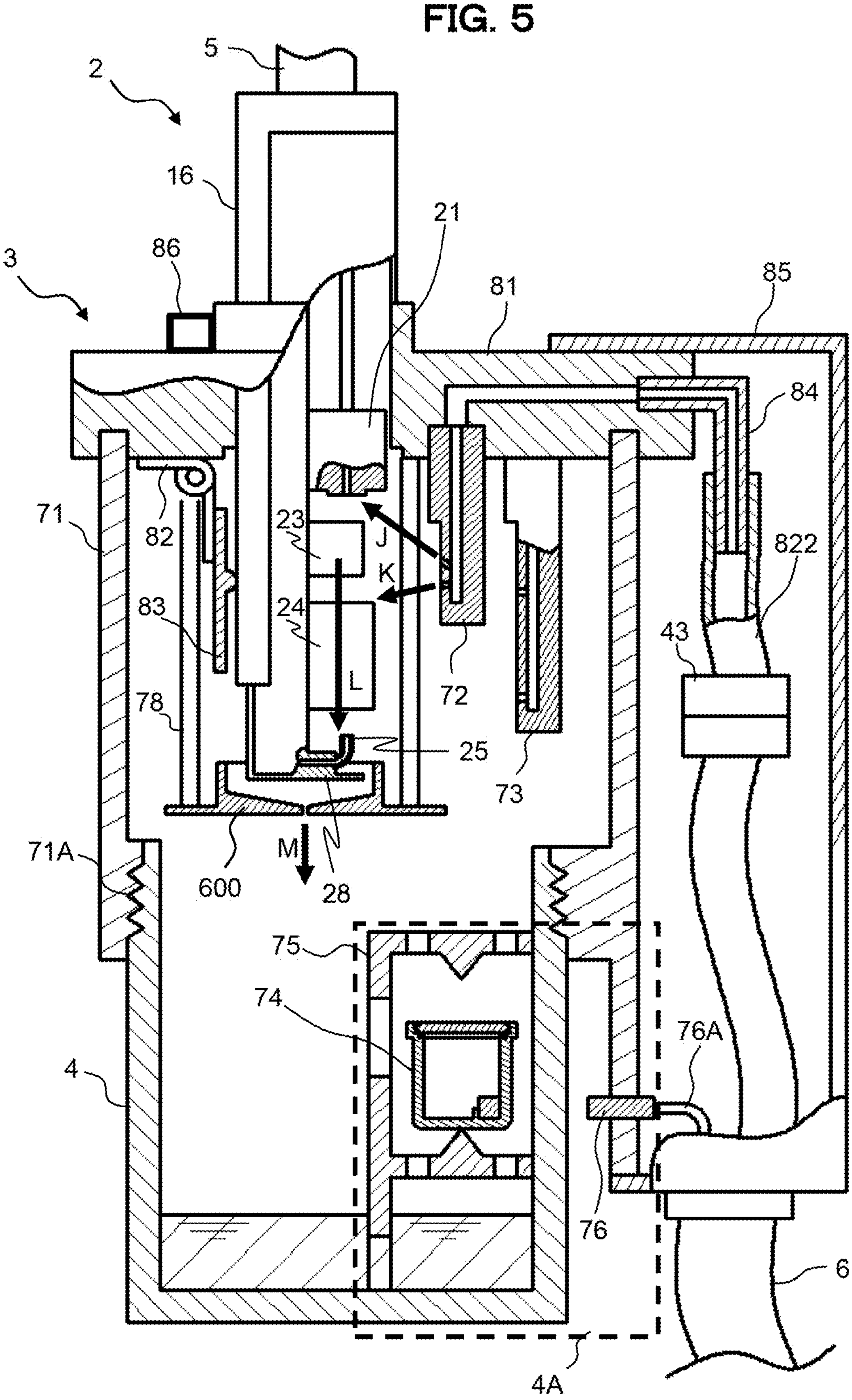
FIG. 5 is a cross-sectional view of the cleaning unit with the printheads set.

Next, a cleaning operation of the printhead 2 by the cleaning unit 3 shown in FIG. 4 is explained using FIG. 5. FIG. 5 is a cross-sectional view of the cleaning unit with the printhead 2 set in the cleaning unit 3. When cleaning the printhead 2, the printhead 2 is set (inserted) into the cleaning unit 3. When setting, the head cover 17 of the printhead 2 is removed.

Cleaning is started by spraying cleaning solution from cleaning nozzle 72 after printhead 2 is set in the cleaning tank 71 of the cleaning unit 3. The cleaning process is initiated by jetting cleaning fluid from the cleaning nozzle 72. The cleaning nozzle 72 sprays the cleaning solution toward the printhead 2 as shown by arrows J and K. The cleaning solution is then applied to the nozzles 21, the charging electrode 23, the deflecting electrode 24, and the gutter assembled on the printhead 2, as well as to the 25, and drips downwards by gravity as shown by arrow L. Thereafter, the cleaning liquid flows into the housing section 602 of the cleaning base portion 600 and is stored therein. The cleaning liquid stored in the housing section 602 stays in the storage portion and cleans the head end portion 28 of the print head 2. Thereafter, the cleaning liquid flows on the inner surface of the housing section 602 and flows out from the liquid drain hole 604 provided on the bottom surface, and also at this time, the cleaning liquid cleans the head end portion 28 of the print head 2. After cleaning the head tip surface, the cleaning liquid flows out of the housing section 602 toward the recovery container 4, as shown by the arrow M, and is contained (accumulated) inside the recovery container 4. When the printhead 2 has been cleaned, the cleaning nozzle 72 stops jetting out the cleaning solution. With this stop, air begins to jet out from air nozzle 73 to dry the printhead 2.

In this way, cleaning of the cleaning unit, including the tip of the printhead, is carried out automatically.

(Cleaning Base Section)

Next, the specific structure of the cleaning base portion 600 used for cleaning the tip of the printhead 2 and its action will be described. Four examples of the structure of the cleaning base portion 600 are described here, but the cleaning base portions that can be used for the present invention are not limited to those described here.

Figure 6A:
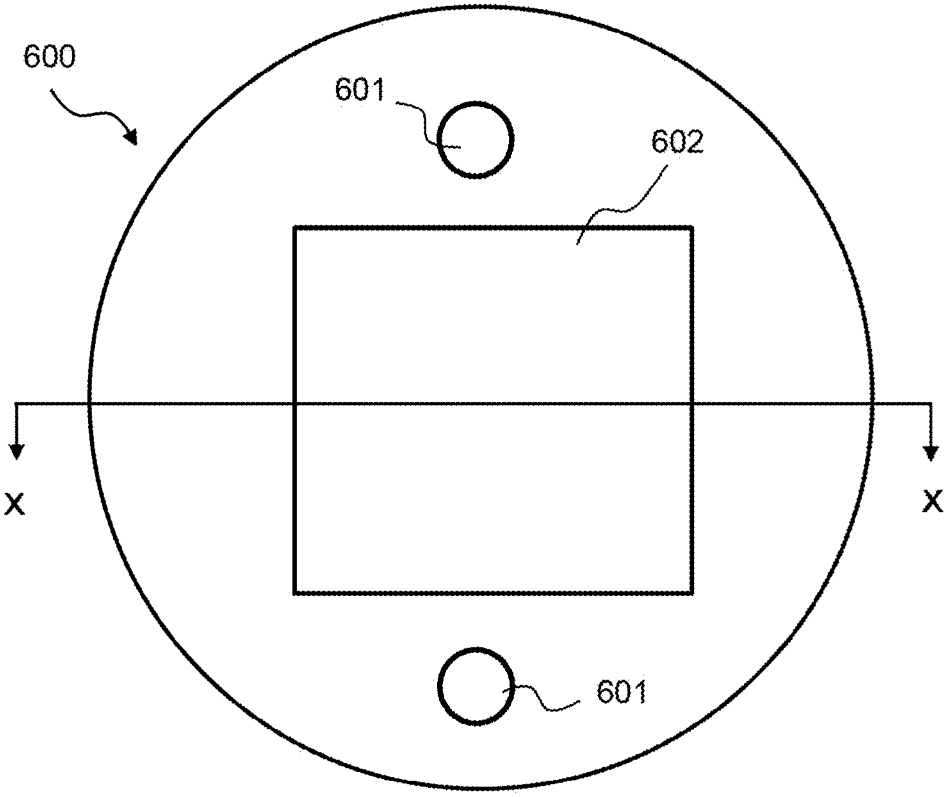
FIGS. 6A and 6B show an example of the configuration of the cleaning base section.
Figure 6B:
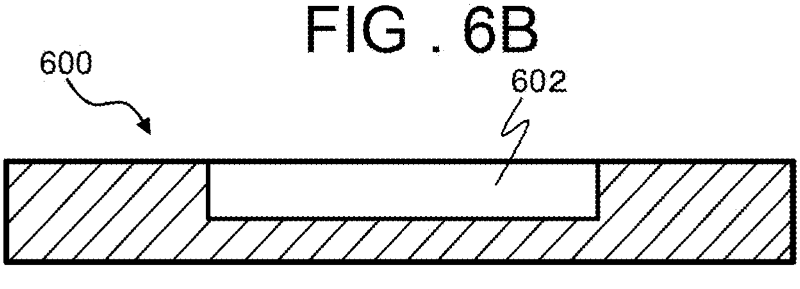

First, the structure of the first cleaning base section is explained using FIG. 6. (A) in FIG. 6 shows a plan view of the cleaning base cleaning base portion 600 of the liquid reservoir system as seen from above the cleaning unit 3, and ((B) shows an X-X cross-sectional view of (A).

In FIG. 6, the two holes 601 are holes for mounting the support rods 78. By attaching the support rods 78 to these holes, the cleaning base portion 600 is supported in the cleaning tank. In the center portion of the cleaning base portion 600, a housing section 602 having a predetermined depth is provided. In this compartment 602, the tip of the printhead 2 is housed and the cleaning liquid that falls into the compartment is collected inside. This accumulated cleaning solution is used to clean the head tip 28. In order to accelerate the cleaning effect, it is also effective to incorporate a vibrator in the cleaning base portion 600 and apply vibration to the cleaning solution for cleaning.

In this method, when the cleaning operation of the printhead 2 is completed, the head tip 28 remains immersed in the cleaning solution and cannot be dried. Therefore, in the cleaning base 600 of this structure, after the cleaning is finished, the support rod 78 is moved downward, and the leading end of the print head is separated from the cleaning liquid to perform a drying operation.

In other words, by means of a drive unit (not shown), the support rod 78 is moved downward so that the head end portion 28 of the head comes out of the cleaning surface of the housing section 602. After this movement, air is blown out from the air nozzle 73 to dry the printhead 2. The housing section 602 shown in FIG. 6 has a structure in which the center portion of the cleaning base portion 600 is hollowed out to create a concave space to collect the liquid. However, as in the cleaning base section described below, the housing section 602 can also be configured with walls on all sides of the center of the cleaning base portion 600. The structure can also be made to have walls on all four sides of the center of the cleaning base portion 600 to form the housing section 602, as in the cleaning base portion described below.

Figure 7A:
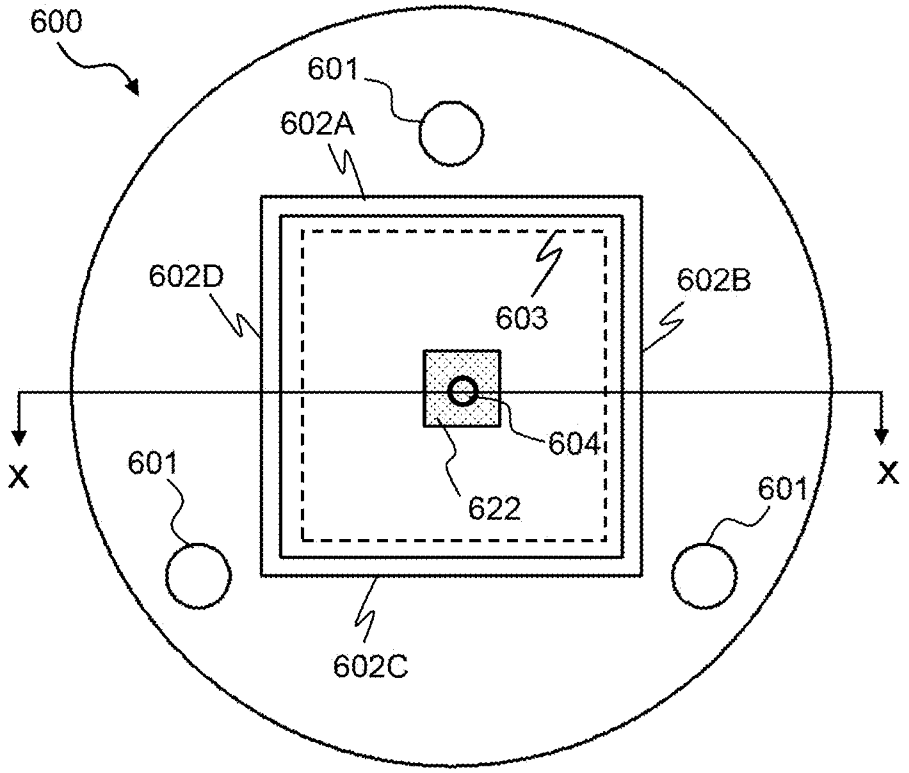
FIGS. 7A and 7B show the configuration of the cleaning base section in the example.
Figure 7B:
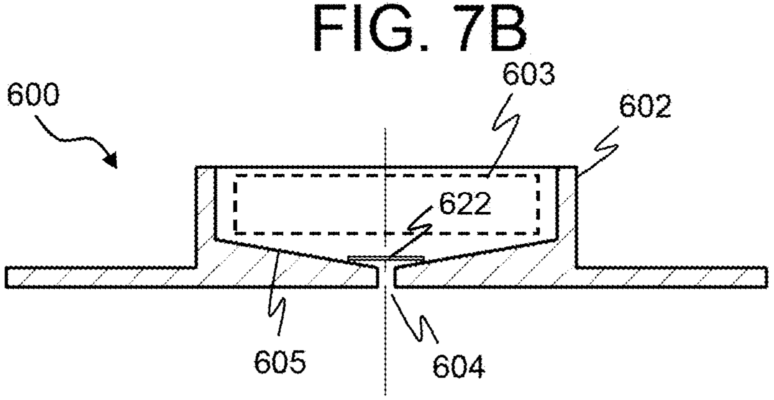

Next, the structure of the second cleaning base portion 600 is described by FIG. 7. The cleaning base portion 600 shown in FIG. 7 is a detailed structure of the cleaning base portion 600 shown in FIG. 4 described above. FIG. 7 (A) is a plan view of the cleaning base portion 600 having a liquid drain hole in the housing section 602, and (B) is a cross-sectional view taken along line X-X.

In FIG. 7, the three holes 601 are where the support rods 78 are attached. By attaching the support rods 78 to the holes 601, the cleaning base portion 600 is supported. The cleaning base portion 600 is supported by attaching the support rods 78 to the holes 601. The housing section 602 in FIG. 7 is formed by walls 602A to 602D provided on four sides. The housing section 602 may be formed by hollowing out the base section as shown in FIG. 6, instead of these walls. In the inner space 603 of the housing section 602, the tip of the printhead 2 is housed and the The space 603 inside the housing 602 houses the tip of the printhead 2, and the cleaning solution that has cleaned the internal parts of the printhead 2 (nozzles, charging electrodes, deflecting electrodes, gutters, etc.) flows into and accumulates in the space 603. In this space 603, the cleaning solution is collected so that the head tip 28 is immersed. The cleaning solution cleans the ink and other contaminants adhering to the head tip.

The cleaning of the head tip 28 by the accumulation of cleaning solution is the same as in FIG. 6. But, the cleaning base portion 600 in FIG. 7, the bottom 605 of the housing section 602 has a liquid drain hole 604 and a filter 622 attached to the top of the drain hole 604 in the bottom 605. This filter 622 removes dust and other impurities from the cleaning solution. As can be seen from FIG. 7 (B), the low part of the housing section 602 has its bottom surface sloped toward its liquid drain hole 604 and has a sloping surface 605 toward it.

With this structure, the cleaning liquid, once accumulated, washes the head tip 28 and flows out through the liquid drain hole 604. This cleaning liquid on its way out washes the head tip 28 by its flowing action. Therefore, the cleaning performance is better than in FIG. 6.

As described above, the liquid drain hole 604 in FIG. 7 collects the cleaning liquid for a certain period of time when the cleaning nozzle is jetting out the cleaning liquid to perform cleaning by liquid accumulation, and the cleaning liquid flows out of the bottom liquid drain hole 604, the cleaning performance is enhanced because the cleaning liquid actively flows through the bottom of the nozzle as it flows out of the liquid drain hole 604. The slope is also desirable to increase the cleaning performance because it enhances this flow. In order to produce such an effect, the size of the drain hole 604 should be such that the flow rate of the cleaning solution flowing out of the liquid drain hole 604 is greater than the flow rate of the cleaning solution flowing into the space 603 than the flow rate of the liquid entering 603.

When the cleaning operation is completed and the jetting of the cleaning solution from the cleaning nozzle 72 is stopped, the cleaning solution accumulated in the housing section 602 naturally falls through the liquid drain holes 604 and flows down to the recovery container 4. Further, since the bottom portion 605 is inclined, the cleaning liquid can be flowed into the recovery container 4 without remaining in the space 603. At a timing when the cleaning liquid is exhausted, air is ejected from an air nozzle 73 to dry the print head 2.

The method of accumulating the cleaning liquid for a predetermined amount of time is not limited to providing a liquid drain hole 604. For example, a lid that opens and closes when a certain amount of liquid is accumulated may be provided. A solenoid valve may also be provided to electrically control the outflow of cleaning solution. In addition, the cleaning solution can be divided into multiple jets to improve the cleaning performance.

Figure 8A:
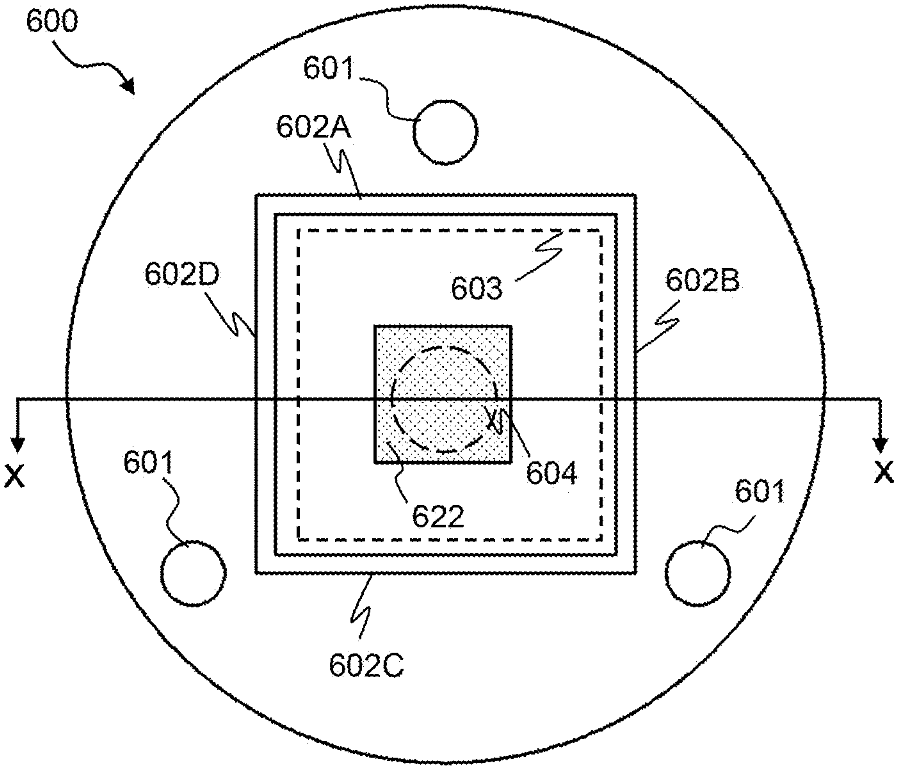
FIGS. 8A and 8B show another example of the configuration of the cleaning base section.
Figure 8B:
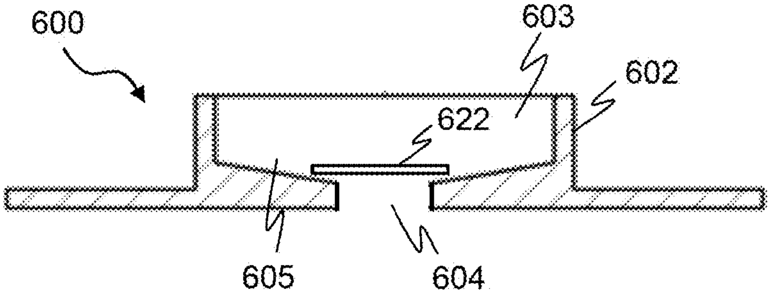

Next, the structure of the third cleaning base portion 600 is described by FIG. 8. FIG. 8 (A) shows a plan view of the cleaning base portion 600 with a liquid drainage hole in the housing section 602, and (B) shows an X-X cross-sectional view of (A). (B) shows an X-X cross-sectional view of (A).

The cleaning base portion 600 shown in FIG. 8 is basically similar to the cleaning base portion 600 shown in FIG. 7. The difference is the size of the liquid drain hole 604. In other words, the size of the liquid drain hole 604 in FIG. 8 is such that the cleaning liquid flowing into the housing section 602 does not accumulate in the housing section 602 but flows toward the liquid drain hole 604 as it is. The head tip 28 is made by this flow of cleaning liquid.

In other words, in the case of FIG. 7, although the cleaning system has a cleaning system that combines cleaning with a liquid reservoir of cleaning liquid and cleaning with a liquid flow, in the case of FIG. 8, cleaning with a liquid reservoir is almost eliminated, and cleaning with a liquid flow is mainly performed. In the cleaning base portion 600 with such a structure, cleaning liquid rarely accumulates in the housing section 602, so that the cleaning unit 3, the drying operation by air nozzles can be started immediately after the cleaning by the cleaning unit 3 is completed.

Figure 9A:
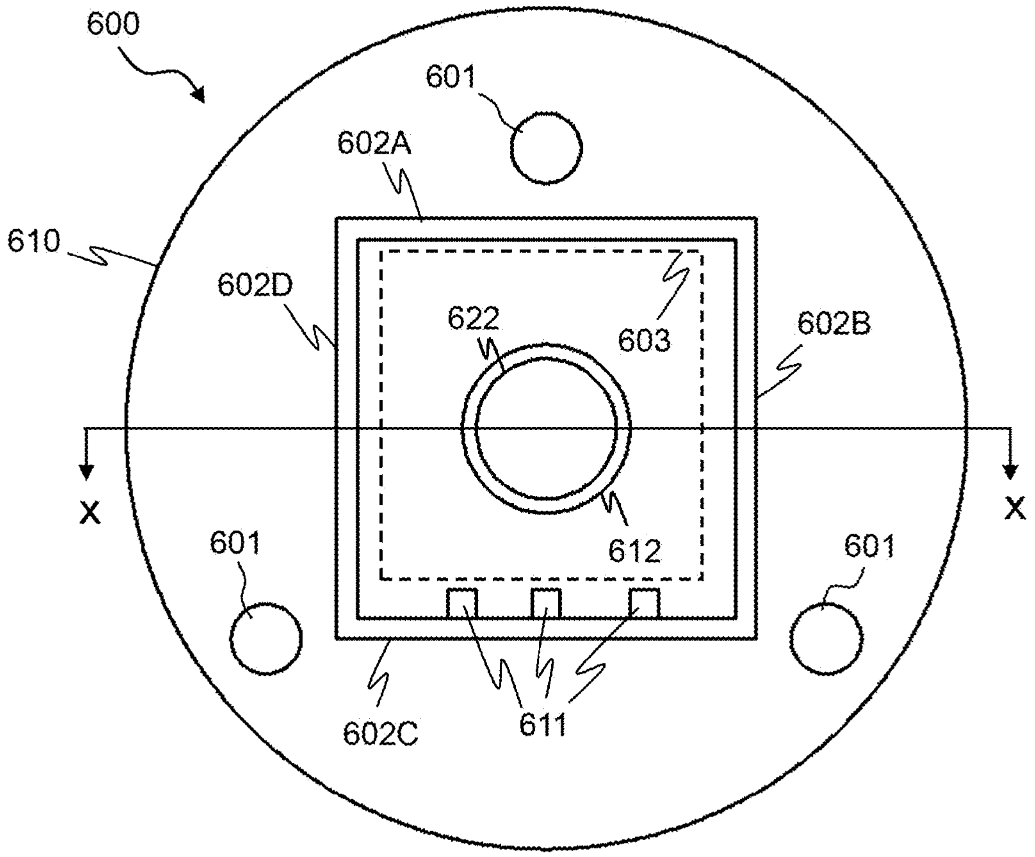
FIGS. 9A and 9B show another example of the configuration of the cleaning base section.
Figure 9B:
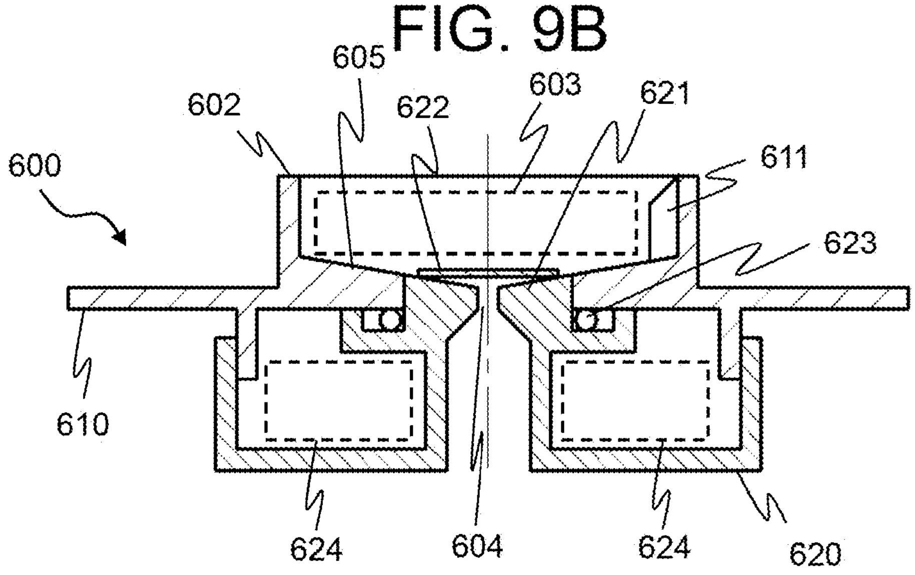

Next, the structure of the fourth cleaning base portion 600 is described by FIG. 9. FIG. 9 (A) shows a plan view of the cleaning base portion 600, which is divided into two parts, the first base part and the second base part, and (B) shows an X-X cross-sectional view of (A).

The cleaning base portion 600 of FIG. 9 is basically the same as the cleaning base portion shown in FIG. 7.

However, the cleaning base part 600 in FIG. 9 consists of two parts: the first base part, liquid reservoir part 61 0, which is the first base part, and liquid drainage part 620, which is the second base part. The liquid reservoir part 610 and the liquid drain part 620 are connected by an easily detachable structure.

The liquid reservoir part 610 has holes 601, walls 602A to wall 602D, and within the housing section 602, which is composed of walls 602D, a printhead 2 and a boss 611 for positioning. Furthermore, the liquid reservoir part 610 has a hole in the upper part 62 of the liquid removal part 620 1 and a hole 612 through which the filter 622 enters. The boss 611 is sloped at the top. Thus, when the print head 2 is inserted into the cleaning base portion 600, the cleaning liquid in the housing section 602 is set at an appropriate position to be ejected to an optimum position. Further, since the boss 611 is in contact with the head end portion 28, the cleaning liquid remaining on the head end portion 28 can be caused to flow slightly by capillarity after cleaning after cleaning. Thus, it is possible to shorten the time for drying the print head 2.

The liquid drainage part 620 has a liquid drain hole 604, a filter 622, and O-ring 623. The head tip 28 is likely to be covered with dust and other particles from the outside, which may be washed away by the cleaning solution and clog the liquid drain hole 604. Therefore, to reduce the frequency of clogging of the liquid drain hole 604, a filter 622 is provided in the upper part 620 of the liquid drain part 620.

Here, since the filter 622 is integrated with the liquid draining part 620, the filter 622 can be replaced simultaneously by replacing the liquid draining part. However, it is not limited to the integral configuration. For example, the filter 622 can be fixed to the upper part by a convex part. In this case, only the filter 622 can be replaced after the liquid removal part 620 is removed. In that case, the liquid drainage part 620 should be cleaned of the liquid drain holes 604, etc., and a new filter 6 22 and reattach it to the liquid reservoir part 610.

The hole 612 in the liquid reservoir part 610 and the liquid drainage part 62 A gap is created between the upper 621 and filter 622 of the 0.

Here, the gap (connection) between the hole 612 and the top 621 has an O-ring 623 can be provided to collect the cleaning liquid in the space 603.

It is also possible that the liquid drain hole 604 or filter 622 is clogged and the space 603, and the liquid remains in the space 603 and filter 622. In such a case, there is a risk that the accumulated cleaning liquid may flow out toward the operator when the liquid removal part 620 is removed. Therefore, a pocket portion 624 is provided to catch the flowing cleaning liquid. The volume of this pocket part 624 is designed to be larger than the volume of space 603. The pocket portion 624 should be made of a transparent or translucent material so that it can be visually confirmed that the cleaning fluid is flowing out. In addition, since the liquid removal part may be removed without noticing that the cleaning liquid is flowing out, for example, the connection between the liquid reservoir part 610 and the liquid removal part 620 may be made of a threaded structure and the number of threads and engagement length may be set to a large number.

Although the cleaning described above utilizes the cleaning solution that has been used to clean the internal parts of the printhead 2, the method of cleaning the head tip 28 is not limited to this method. For example, a cleaning nozzle that can spray cleaning solution directly onto the head tip 28 can be installed and cleaned separately from the cleaning nozzle for internal cleaning.

(Operation Flow of Cleaning Control)

Figure 10:
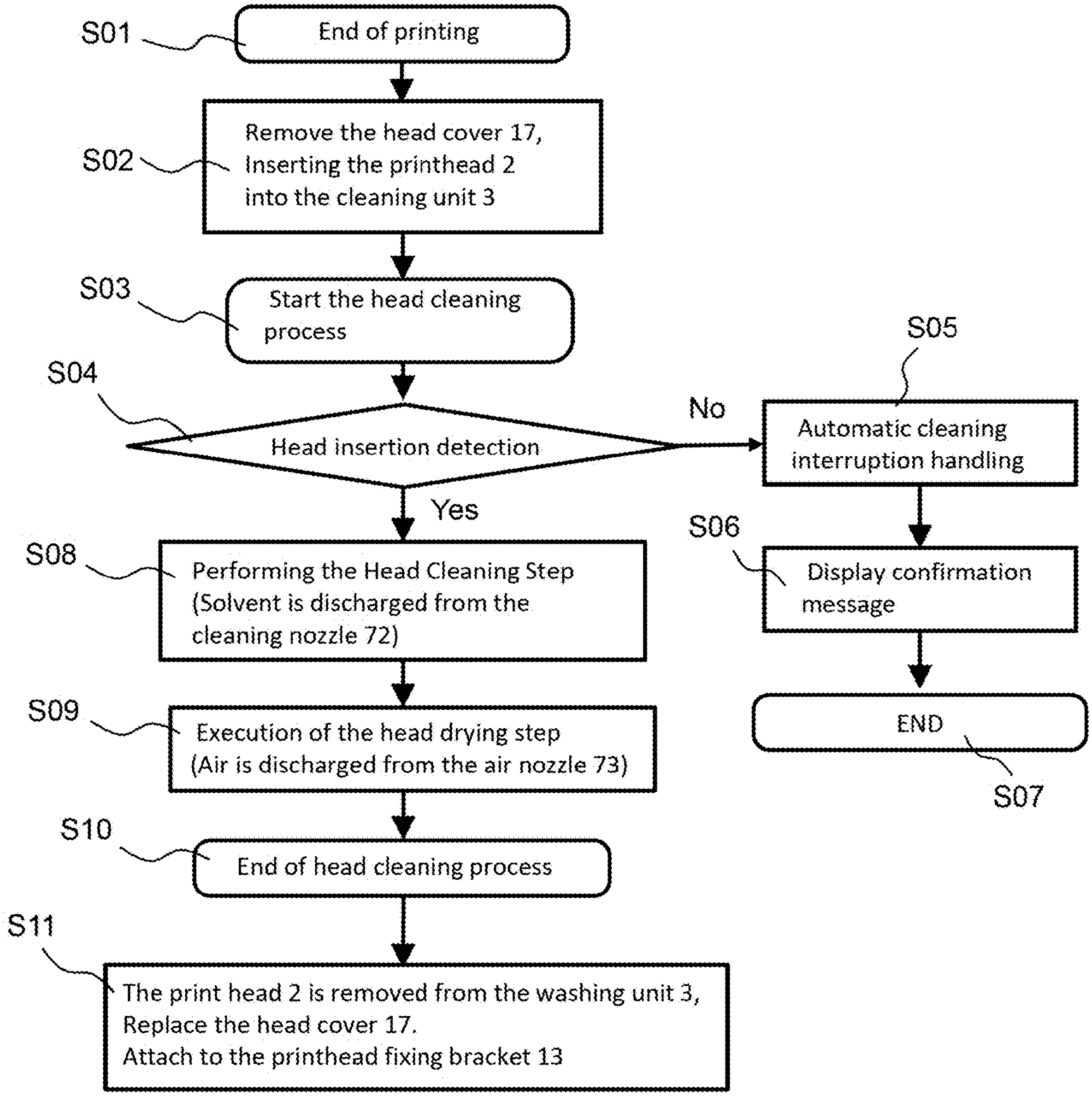
FIG. 10 shows a operation flow diagram of the printhead cleaning function.

Next, the operation flow of the cleaning control is explained using FIG. 10. Cleaning of the printhead 2 is performed under the control of the control unit (not shown) after the printing operation is completed.

First, ink jetting from the nozzles is stopped due to the completion of the printing operation. This state is step S01. Step S01 allows the printhead 2 to be cleaned. In step S02, the operator removes the head cover 17 from the printhead 2 and checks the internal parts and the head tip 28 are dirty with ink or other substances. Then, if cleaning is deemed necessary, the operator inserts the printhead 2 into the cleaning unit 3.

Next, in step S03, the operation display 8 provided in the inkjet recording apparatus 100 (see FIG. 1) is used to instruct the control unit to start the head cleaning function of the cleaning unit 3.

In step S04, when the processing of the head cleaning function is started, the sensor 27 provided in the cleaning unit 3 is used to detect whether the printhead 2 is set in the cleaning unit or not. Here, if it is detected that the printhead 2 is inserted (in the case of YES), step S08. If it is detected that Printhead 2 is not inserted (in the case of NO), go to step S05.

In step S05, the automatic cleaning interruption process is performed. Next, in step S06, an alarm is displayed on the operation display (e.g., "No head insertion"). A buzzer or similar device may also be used to notify the operator. Then, in step S07, the head cleaning process is stopped. This prevents wasteful use of cleaning solution in case of operator error, for example.

Step S08 executes a sequence of ejecting cleaning liquid from the cleaning nozzle 72 and cleaning the head inner part and head tip 28. The details of this sequence control have already been explained, and are omitted here. During this cleaning process, cleaning performance is improved if the cleaning solution is jetted out intermittently, allowing cleaning with less cleaning solution. When cleaning is completed, the process proceeds to step S09.

Next, in step S09, a sequence control is executed to dry the printhead 2 by discharging drying air from the air nozzles 73. At this time, the drying air is branched, with one jet directed toward internal parts and one toward areas where solvent gas tends to leak. This allows the concentration of solvent gas discarded outside during drying to be suppressed. Another method to control the concentration of solvent gas is to provide a suction pump to suck out the generated solvent gas to the main unit 1.

The operation of step S09 may be initiated while the cleaning solution jetted out in step S08 is still in the housing section 602. The operation of steps S08 and S09 can be confirmed on the operation display 8. The operator may be able to interrupt the head cleaning process at any desired timing.

When the cleaning process sequence is completed, go to step S10 to stop printhead cleaning. When the stop or completion is complete, the end screen of head cleaning is displayed on the operation display 8.

In step S11, the operator removes the printhead 2 from the cleaning unit 3 and attaches the head cover 17 is attached. Then, by attaching printhead 2 to printhead fixing fixture 13, printing can be resumed.

When the inkjet recording apparatus 100 is stopped, the printhead 2 may be left attached to the cleaning unit 3. If the head cleaning process is then performed when the inkjet recording apparatus 100 is started up (launched), it has the effect of reducing the occurrence of problems such as ink particles not being collected in the bent gutter at the time of startup.

In steps S08 and S09, the operator may select a sequence in which the cleaning solution jetting and drying air jetting times are different. The operator may be able to select a sequence with a different time for cleaning liquid jetting and drying air jetting in steps S08 and S09. There may also be a function that allows the operator to set the time of the sequence.

The inkjet recording apparatus 100 can be provided with a function to keep a log of the head cleaning process performed. By providing this function, the amount of solvent used can be calculated. Thereby, for example, when the amount of cleaning solution accumulated in the recovery container reaches the recommended amount of waste solvent, a message can be displayed after step S10 to dispose of the cleaning solution accumulated in the recovery container. Then, when the sensor 76 detects that the recovery container has been removed, the amount of liquid accumulated in the recovery container can be reset. This allows the operator to be notified when to discard the liquid before the recovery container is filled with cleaning solution, even if an error occurs in the liquid level detection device.

The present invention is not limited to the examples of the invention described above, but includes variations in which the configuration is changed within the scope that does not depart from the technical concept and purpose of the invention. The above examples are described in detail to facilitate understanding of the invention, and the invention is not limited to those having all the described configurations. It is also possible to add, delete, or replace some of the configurations of the embodiments with other configurations.

REFERENCE SIGNS LIST

1 Main unit
2 Printhead
3 Cleaning unit
4 Recovery container
4A Liquid level detector
5 Conduit
6 Conduit
8 Operation display
11 Belt conveyor
12 Print object
12A Print object
12B Print object
13 Fittings for fixing printhead
16 Head base
17 Head cover
18 Protective cover
21 Nozzle
23 Charging electrode
24 deflecting electrode
25 Gutter
26 Switching valve
27 Sensor
28 Head tip
28A Aperture for printing
31 Ink container
31A Level detection device
32 Auxiliary ink container
33 Solvent container
34 Pump
37 Pump
38 Pump
39 Filter
40 Filter
41 Filter
43 Filter
45 Viscosity measuring device
46 Regulating valve
47 Pressure sensor
49 Solenoid valve
50 Solenoid valve
53 Solenoid valve
54 Solenoid valve
55 Solenoid valve
56 Solenoid valve
68A Ink
68B Ink
68C Ink
69A Solvent
69B Cleaning solution
71 Cleaning tank
71A Mounting portion
72 Cleaning nozzle
72A Liquid discharge hole
72B Liquid discharge hole
73 Air nozzle
73A Air discharge hole
73B Air discharge hole
74 Float
75 Holder
76 Sensor
76A Electric wire
78 Support rod
81 Lid block
81A Insertion
82 Lid hinge
83 Lid member
84 Liquid coupling
85 Cover
86 Proximity sensor

91 Fixing jig
92 Fixing jig
93 Fitting part
100 Inkjet recording apparatus
600 Cleaning base portion
601 Hole
602 Housing section
602A-602D Wall
603 Space
604 Liquid drain hole
605 Bottom
610 Liquid reservoir part
611 Boss
612 Hole
620 Liquid drainage part
621 Top
622 Filter
623 O-ring
624 Pocket part
801-805 Pathway
809-811 Pathway
821 Pathway
822 Pathway
825 Pathway
901 Merging pathway
903 Branch pathway

The invention claimed is:

1. An inkjet recording apparatus comprising:

a print head that receives a supply of ink and prints on a printed object;

a main body that supplies the ink to the print head; and a cleaning unit in which the print head is inserted, the cleaning unit being configured to clean the print head with a cleaning solution, wherein a cleaning base portion that accommodates a tip of the print head and has a storage portion into which the cleaning solution can flow is provided in the cleaning unit;

wherein the storage portion is provided with an inclined surface, and a drain hole that allows the cleaning solution to flow out is formed at a lower end of the inclined surface;

wherein the drain hole has a size that allows the cleaning solution that is flowed into the storage portion to remain in the storage portion for a predetermined period of time; and wherein when the print head is attached to the cleaning unit, the tip of the print head is positioned in a space surrounded by the inclined surface of the storage portion or a peripheral wall on an upper end side of the inclined surface.

2. The inkjet recording device according to claim 1, wherein the cleaning base portion includes a first base portion having a hole that opens into the bottom of the cleaning base portion, and a second base portion that receives the cleaning solution flowing down from the first base portion and bonds with the first base portion.

3. The inkjet recording apparatus of claim 1, wherein a solvent container holding solvent in the main body is provided, and a cleaning solution supply unit for supplying the solvent as the cleaning solution is provided.

4. The inkjet recording apparatus according to claim 1, wherein an air nozzle for drying the print head after cleaning and an air supply path for supplying air to the air nozzle is provided in the cleaning tank.

5. The inkjet recording apparatus according to claim 1, further comprising a driving unit that has a holding member for holding the cleaning base portion and that allows the holding member to move vertically.

6. The inkjet recording apparatus according to claim 1, wherein the tip of the print head is cleaned with the cleaning solution stored in the storage portion for the predetermined period of time.

7. The inkjet recording apparatus according to claim 6, wherein the tip of the print head is cleaned by utilizing a flow of the cleaning solution toward the liquid drain hole.

8. A method for cleaning an inkjet recording apparatus including a print head that receives a supply of ink and prints on a printed object, a main body that supplies the ink to the print head, and a cleaning unit into which the print head is inserted and which cleans the print head with a cleaning solution, the method comprising:

receiving the cleaning solution in a cleaning base portion of the cleaning unit that accommodates the print head and has a storage portion into which the cleaning solution can flow, wherein the storage portion is provided with an inclined surface, and a drain hole that allows the cleaning solution to flow out is formed at a lower end of the inclined surface; and washing a distal end portion of the print head, which is accommodated in the cleaning base portion, with the cleaning solution;

wherein the drain hole has a size that allows the cleaning solution that is flowed into the storage portion to remain in the storage portion for a predetermined period of time; and wherein when the print head is attached to the cleaning unit, the tip of the print head is positioned in a space surrounded by the inclined surface of the storage portion or a peripheral wall on an upper end side of the inclined surface.

9. The method for cleaning an inkjet recording apparatus according to claim 8, wherein a solvent container holding a solvent is provided in the main body, and said solvent is supplied to said cleaning nozzle of said cleaning unit as said cleaning solution to clean said print head.

10. The method for cleaning inkjet recording apparatus according to claim 8, wherein an air nozzle for drying the print head is provided in the cleaning tank, and after the cleaning of the print head is completed, the print head is dried by air from the air nozzle.

* * * * *